United States Patent [19]

Sharma

[11] Patent Number: 5,559,970
[45] Date of Patent: Sep. 24, 1996

[54] CROSSBAR SWITCH FOR MULTI-PROCESSOR, MULTI-MEMORY SYSTEM FOR RESOLVING PORT AND BANK CONTENTION THROUGH THE USE OF ALIGNERS, ROUTERS, AND SERIALIZERS

[75] Inventor: Vinod Sharma, Tokyo, Japan

[73] Assignee: NEC Corporation, Tokyo, Japan

[21] Appl. No.: 237,843

[22] Filed: May 4, 1994

[30] Foreign Application Priority Data

May 6, 1993 [JP] Japan ................................. 5-105226

[51] Int. Cl.$^6$ ................................................. G06F 13/00
[52] U.S. Cl. ........................... 395/312; 395/475; 395/477
[58] Field of Search ........................... 395/325, 425, 395/312; 364/200

[56] References Cited

U.S. PATENT DOCUMENTS

| | | | |
|---|---|---|---|
| 4,745,545 | 5/1988 | Schiffleger | 364/200 |
| 5,197,130 | 3/1993 | Chen et al. | 395/325 |
| 5,202,970 | 4/1993 | Schiffleger | 395/425 |
| 5,239,629 | 8/1993 | Miller et al. | 395/325 |
| 5,276,838 | 1/1994 | Rao et al. | 395/425 |

FOREIGN PATENT DOCUMENTS

0365745A3  5/1990  European Pat. Off. .

OTHER PUBLICATIONS

N. Tzeng, "A Cost–Effective Combining Structure for Large–Scale Shared–Memory Multiprocessors," IEEE Transactions on Computers, vol. 41, No. 11, Nov. 1, 1992, pp. 1420–1429.

B. J. Rodriguez et al, "Combining Produce and Consume Operations in a Pipelined Shared Memory Multiprocessor," Proceedings of the Supercomputing Conference, Reno, Nov. 1989, pp. 485–494.

Karol et al., "Input Versus Output Queueing on a Space–Division Packet Switch", *IEEE Transactions on Communications*, vol. COM–35, No. 12, pp. 1347–1356 (Dec. 1987).

*Primary Examiner*—Jack B. Harvey
*Assistant Examiner*—Sumati Lefkowitz
*Attorney, Agent, or Firm*—Foley & Lardner

[57] ABSTRACT

A self-routing crossbar switch interconnects a plurality of processors with a plurality of memory modules. In a self-routing crossbar switch connecting N processors and N memory modules, a processor is connected to each input port and a memory module is connected to each output port; each of the N processors can transmit a memory request simultaneously provided that there is no port contention and no bank contention. Port contention occurs if two or more processors attempt to access the same output port of the self-routing crossbar switch at the same time. The memory module consists of several memory banks that are connected in an interleaved manner. If the memory bank is accessed before it is ready to accept a new request, bank contention is said to have occurred. In the self-routing crossbar switch the requests directed to a port are first passed through an aligner and a conflict resolution logic. There is one aligner associated with each output port. The aligner inputs the requests directed at an output port and aligns them so that, at the output of the aligner, all the active requests appear in a consecutive fashion. The conflict resolution logic resolves the port and bank contention.

5 Claims, 13 Drawing Sheets

| CLOCK | ACCESSED BANK | DATA AVAILABLE |
|-------|---------------|----------------|
| 1 | 0 | - |
| 2 | 1 | - |
| 3 | 2 | - |
| 4 | 3 | - |
| 5 | 1 | 0 |
| 6 | - | 1 |
| 7 | - | 2 |
| 8 | - | 3 |
| 9 | - | 0 |

CROSSBAR SWITCH FOR MULTI-PROCESSOR, MULTI-MEMORY SYSTEM FOR RESOLVING PORT AND BANK CONTENTION THROUGH THE USE OF ALIGNERS, ROUTERS, AND SERIALIZERS

BACKGROUND OF THE INVENTION

1. Field of the Invention

The present invention relates to a crossbar switch in a multi-processor system.

2. Description of the Related Art

In a multiprocessor system, a self-routing crossbar switch is often used to connect a plurality of processors with a plurality of memory modules. The processors are connected to the input ports and memory modules to the output ports. In vector processing computers, the processors are vector processing units that perform the same operation on multiple data streams. For example, an operation may consist of fetching a pair of operands from two arrays A and B present in the memory, adding the fetched pair and storing the result back into the memory in a third array C. To fully utilize the processing capability of the vector processing units (VPUs), it is necessary that the operands required to perform the operation are made available to the VPUs at a rate that is commensurate with their processing capability. Self-routing crossbar switches can be used to interconnect the VPUs with the memory modules so that if the VPUs access different output ports, all the VPU accesses to the memory can progress simultaneously. The self-routing crossbar switches can also be used to interconnect general purpose processing units to achieve very high system throughput. The self-routing crossbar switches also find applications in telephone exchanges where a number of subscribers have to be interconnected simultaneously. The ATM (Asynchronous Transfer Mode) switch is an example of a self-routing crossbar switch extensively used in the telecommunications field.

Consider a self-routing crossbar switch consisting of 2N ports, N processors are connected on one side and N memory modules to the other side to the ports of the self routing crossbar switch. If the N processors access the N memory modules, all the accesses can progress simultaneously. The bank conflict issue is ignored for a moment to simplify the discussion. If more than one processor attempts to access the same port at the same time, port conflict is said to occur. The input requests have to be serviced sequentially. If more requests arrive at a port when previous requests have not been serviced, the incoming requests have to be stored temporarily.

The requests are stored in a first-in first-out (FIFO) buffer, for example. In Mark J. Karol et al. "Input Versus Output Queueing on a Space-Division Packet Switch", IEEE Transaction on Communication, Vol. COM-35, No. 12, December 1987, there is disclosed a technology for reducing influence of port conflict by providing a FIFO buffer at an input or output side of the crossbar switch. In the prior art, if the port conflict occurs at the output side, the overall performance is improved by reducing influence of the port conflict for the input side.

However, in the prior art, it becomes necessary to arbitrate a plurality of requests which are causing port conflict and to supply them to the port in an appropriate order.

On the other hand, even in the case where no port conflict is occurring, it is possible to have a bank conflict as discussed below, which may potentially be a cause of degradation of performance. In the memory system, assuming a memory cycle is M, it is required to wait for the period M in order to access the same memory. Therefore, in the memory system directed to higher performance, interleaved P memory banks are provided so that each memory bank may be accessed in a period of M/P. However, even in such banked memory system, it is still required to wait for the period M (hereinafter referred to as "bank cycle") in order to sequentially access the same memory bank. Occurrence of access for the same memory bank within the bank cycle is referred to as the bank conflict.

SUMMARY OF THE INVENTION

It is an object of the present invention to solve a problem caused by influence of port conflict by efficiently aligning requests for the same port.

Another object of the present invention is to provide a function for solution of a problem of bank conflict.

According to one preferred embodiment, a crossbar switch in a multi-processing system transfers each memory access request from a plurality of processors at an input side to an arbitrarily selected one of a plurality of memory modules at an output side, and when a plurality of memory access requests are generated for the same memory module at the output side, respective memory access requests for the relevant memory module are aligned and serialized.

DETAILED DESCRIPTION OF THE INVENTION

Figure 1:
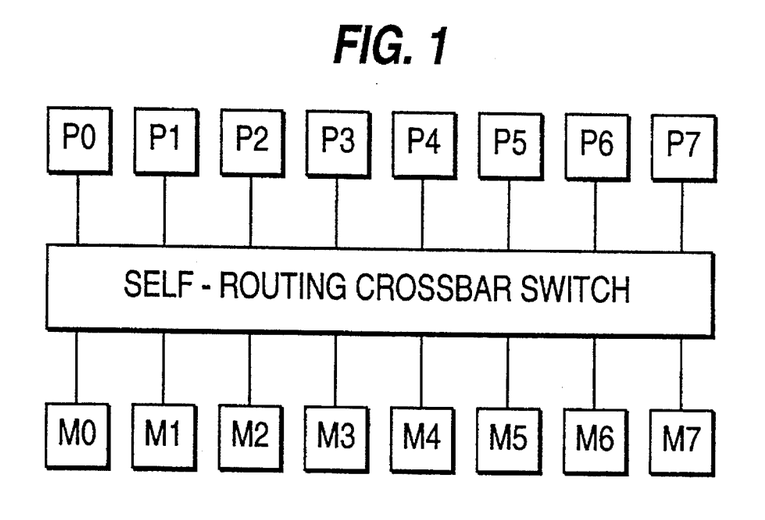
FIG. 1 is a block diagram of a computer system consisting of a plurality of processors connected to a plurality of memory modules through a self-routing crossbar switch.

Referring to FIG. 1, a simplified block diagram of a computer system comprises 8 processors, designated as P0, P1, ..., P7; and 8 memory modules, designated as M0, M1, ..., M7 interconnected through a self-routing crossbar switch. Any of the 8 processors can communicate with any of the 8 memory modules simultaneously provided the accesses are made to different output ports. It would be interesting to compare the processor-memory interconnection using a self-routing crossbar switch with the interconnection using a bus often used in low-cost, low-performance systems. In a bus network, only one processor can communicate with a memory module at a time. If a plurality of processors wish to access the memory modules, even though the memory modules are all distinct, they have to be accessed serially since the bus can be used by only one processor at a time.

Figure 2:
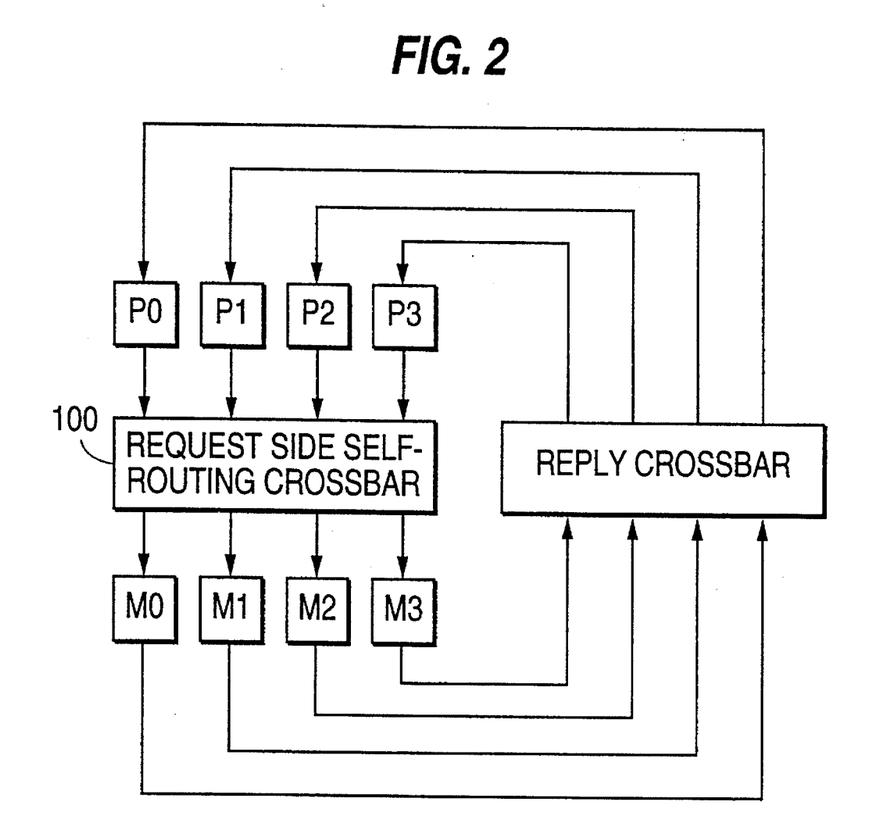
FIG. 2 shows a self-routing crossbar switch composed of a request side self-routing crossbar switch and a reply side crossbar switch.

Referring to FIG. 2, a computer system is shown, with 4 processors and 4 memory modules interconnected through (i) request side self-routing crossbar 100, and (ii) reply crossbar. In the request side self-routing crossbar 100, the processors are connected to the input ports and memory modules to the output ports. In the reply side crossbar, the memory modules are connected to the input ports and processors to the output ports. The reply crossbar is controlled by the request side self-routing crossbar switch 100. A processor performs two basic operations on memory: write operation and read operation. In the write operation, the data and the address of the memory location where the data is to be written are sent through the request side self-routing crossbar 100 to the memory. In the write operation, only the request side self-routing crossbar switch 100 is used. In the read operation, the address of the memory location to be read is sent to the memory through the request side self-routing crossbar switch 100. The memory sends the contents of the addressed location to the processor that requested the data through the reply crossbar.

A packet contains the information to be sent to the memory and the way routing is to be done. The packet also has a request active bit associated with it to indicate that the information is valid. The reply crossbar routing is controlled by the request side self-routing crossbar switch 100; when the address of a read request was sent to a memory module, the reply crossbar is also set up so that the data gets routed to the appropriate requester.

In a self-routing crossbar switch, the requesters, e.g., the processors are connected to the input ports and the destinations, e.g., the memory modules are connected to the output ports. When the requesters access different output ports simultaneously and there is no bank conflict, all the requests can be serviced simultaneously. However, when more than one request wishes to access the same output port simultaneously, a port contention takes place. To resolve the port contention, we need a mechanism that monitors the requests that are being sent to an output port so that when it finds a port contention, the requests are serialized and sent to the output port one by one. It also informs the requesters that a port contention took place and the resolution of the port contention is in progress. The requesters take an appropriate action when they receive a port conflict signal. For example, if the crossbar has adequate buffers to temporarily store the requests that can not be serviced immediately, the requesters can continue to send new requests until the buffer space runs out. If there are no buffers, the requesters should halt the transmission of new requests immediately.

There has always been a mismatch in the memory speed and the processor speed. The processor can generate the requests for the memory at a rate that is much higher than the rate at which the memory can accept them. It is assumed in the discussion that the requesters are capable of generating a request every clock cycle. If dynamic RAM is used to implement the memory, the memory can be as slow as a factor of 16 compared to the processor speed. If static RAM is used, the processor is still faster by a factor of 4 in the state-of-the-art technology. With the advance of technology, this gap is narrowing, but still the memory speed is not able to improve in the same way as the processor speed. Clearly, some mechanism is required to make this speed mismatch as unnoticeable to the processor as possible. A scheme often used to hide the memory delay is called interleaving.

Figure 3:
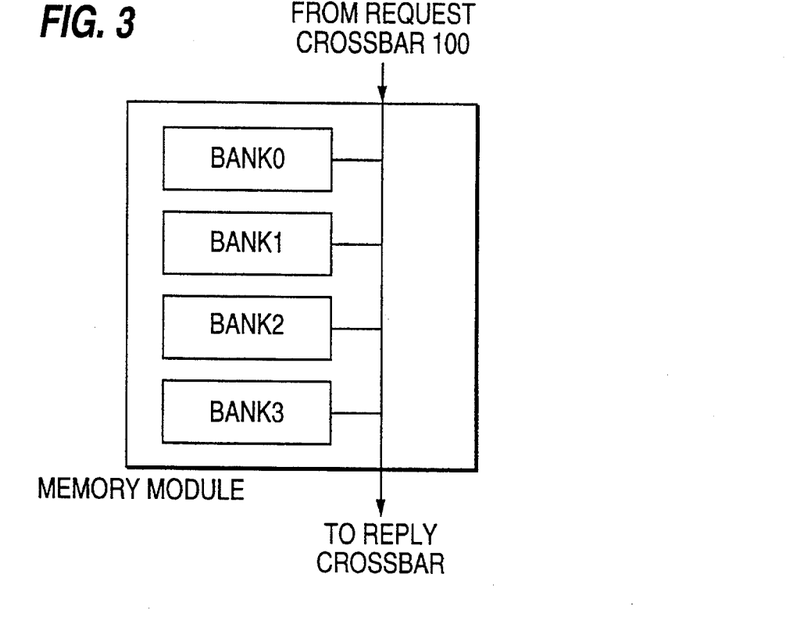
FIG. 3 is a block diagram of a memory module consisting of a plurality of memory banks.

Referring to FIG. 3, a memory module consists of 4 memory banks. Suppose that the memory is 4 times as slow as the processor. Let us assume that the processor accesses the memory linearly, i.e., if the first address is x, the next address are (x+1), (x+2), . . . .

Figure 4:
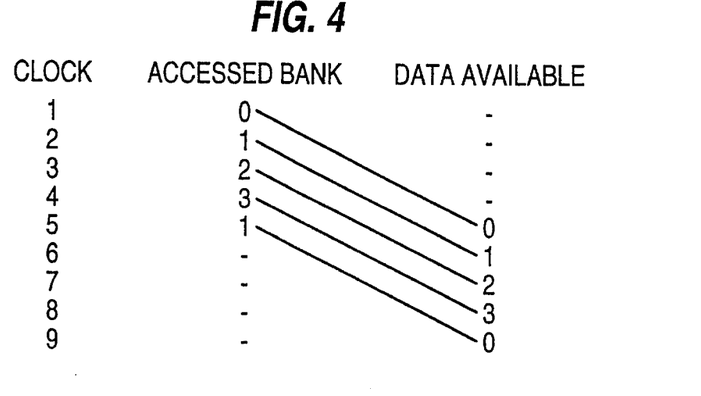
FIG. 4 illustrates the memory bank interleaving mechanism.

Referring to FIG. 4, in the interleaving mechanism, the address x accesses the first memory bank, which is bank0, in the first clock cycle. The data from bank0 will be available after a delay of 4 cycles in the fifth clock. In the second clock cycle, access is made to bank1 using the address (x+1). The data from the bank1 will be available after a delay of 4 cycles in the sixth clock. During the third and fourth clocks the accesses are made to banks 2 and 3; and the data is available in seventh and eighth clocks respectively. Note that in the fifth clock, 4 cycles would have elapsed since the bank0 was last accessed; therefore the bank0 can be accessed again. Thus, if the 4 memory banks are accessed cyclically, each bank will be accessed only once in 4 cycles. After an initial delay of 4 cycles, data will be available every cycle. The scheme of interleaving works well as long as a memory bank is accessed no more than once in 4 cycles. The worst case is when the access pattern is like x, x+4, x+8,... In this case, the same memory bank0 will be repeatedly accessed. Since the memory bank0 can service only one request per 4 cycles, the request rate has to be dropped by a factor of 4. When, an access is made to a bank that is not ready, i.e., it can not accept the requests, a bank conflict is said to take place and some mechanism is required to resolve this bank conflict. The bank conflict resolution is explained later.

Figure 5:
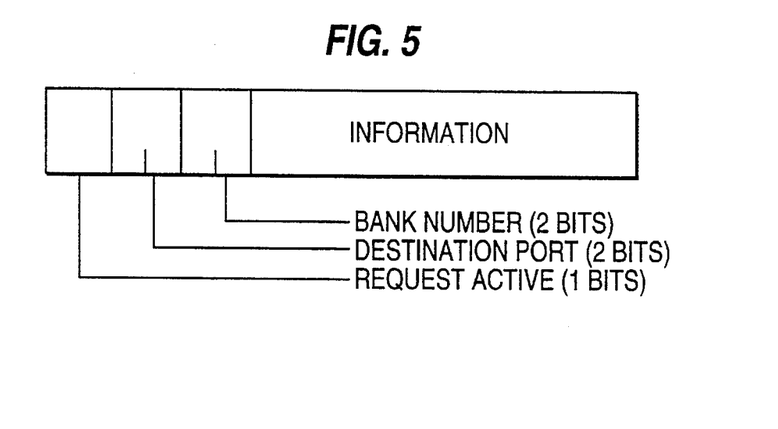
FIG. 5 describes the packet format of a memory request.

Referring to FIG. 5, the format of a request or an information packet has 4 fields:

Request_active:

Request_active is a one-bit field that indicates that the request is valid.

Destination_port:

The size of the destination_port field depends on the number of output_ports of the crossbar. For n output ports (assume $n=2^m$), m bits will be required.

Bank_number:

As described above, an output port of the crossbar is connected to a memory module and the memory module can have several banks connected to it. The bank_number is used to select the appropriate bank. If there are b banks (assume $b=2^p$), p bits will be required.

Information:

The information to be routed from the source to the destination appears in this field. The size of the information field is limited by the practical constraints of technology, cost etc.; for example the maximum number of wires that can be routed in a given space is a technology constraint.

Figure 6:
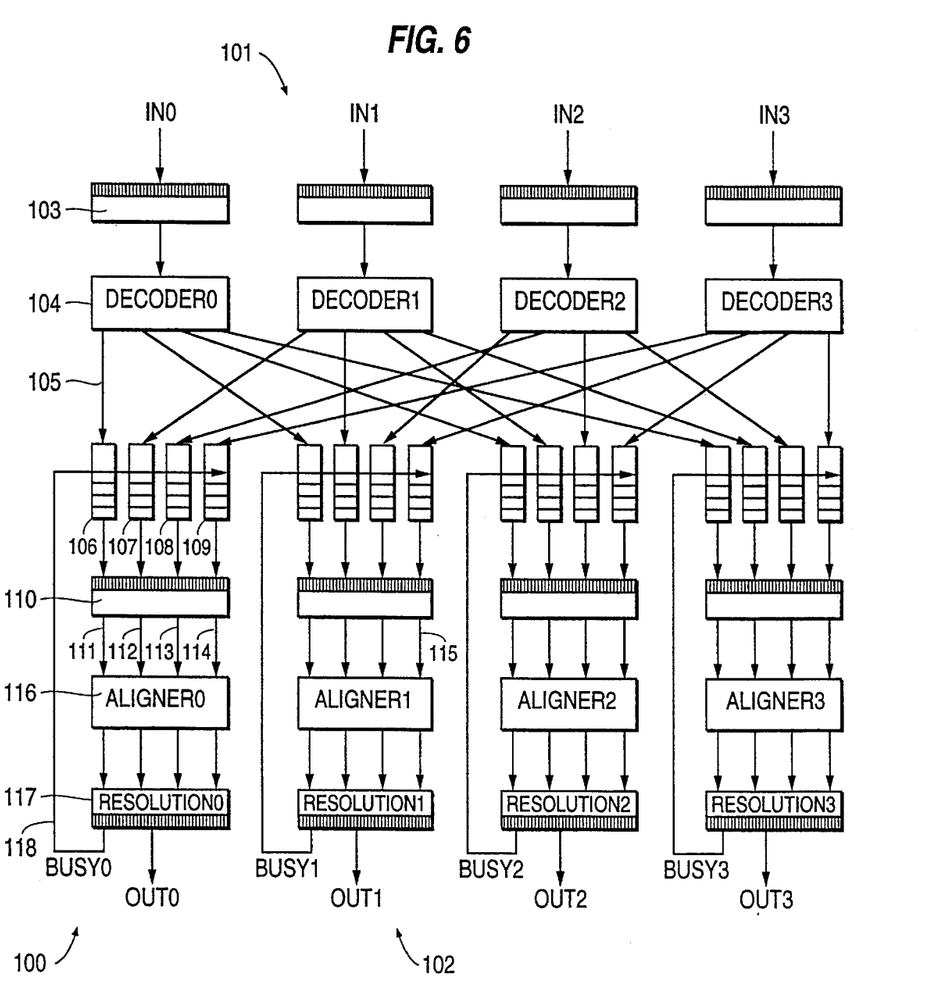
FIG. 6 is a detailed block diagram of a 4×4 self-routing crossbar switch. A self-routing crossbar switch consists of latches, decoders, first-in-first-out (FIFO) buffers, aligners and logic to resolve port contention and bank contention.

Referring to FIG. 6, the functional diagram 100 of a 4×4 self-routing crossbar switch comprises 4 input ports and 4 output ports. The input ports at 101 are designated as IN0, IN1, IN2 and IN3. The requests are input at the input ports. The format of the requests is as shown in FIG. 5. The crossbar examines the request_active and destination_port fields of an input. If the request is active, it is routed to the appropriate output port using the routing information present in the destination_port field of the incoming information packet. The outputs at 102 are designated as OUT0, OUT1, OUT2 and OUT3.

Any of the inputs at 101 can access any of the outputs at 102. If there is only one request wishing to access a particular output port at a time, there is no contention and all the requests can be serviced simultaneously. The effect of bank contention has been omitted here to simplify the discussion. It will be incorporated at a later stage. When more than one request wishes to access the same output simultaneously, there is a port contention. To resolve the port contention, the following actions must be taken:

1. The requests that can not be serviced immediately are buffered so that they are not lost.
2. The requests must be serialized and sent to the output port one by one.
3. If there is a possibility of buffers running out of space, a signal should be sent to the requesters to halt the transmission of any new requests.

Explanations of how the incoming requests are routed to the output port and how the port contention resolution logic works are as below.

The requests arrive at 101 and they are latched; for example 103 latches the incoming request at IN0. The latched request is input to the decoder. The decoder 104 decodes the latched request IN0. The decoder is activated if the request_active bit of the input request is set. Depending on the destination_port field, the request is forwarded to one of the 4 outputs of the decoder 104. For example, if the destination_field is 0, the incoming packet is forwarded to a line 105 and eventually to OUT0. Similar description holds good for the other inputs also. Each input has its own set of latches and decoder. Henceforth, only the path leading to OUT0 will be described. The description can be extended to the paths leading to other outputs, namely, OUT1, OUT2 and OUT3.

The requests for the output port OUT0 can arrive from any of the 4 inputs 101. Depending on the status of the busy0 signal 118 and the buffers 106–109, the requests are either latched directly into the latches 110 or stored in the first-in first-out (FIFO) buffers 106–109. If busy0 is not active and the buffers 106–109 are all empty the requests are directly latched into the latches 110. If busy0 is not active but the buffers are not empty, the incoming requests are stored in their buffers and the requests stored in the buffers are read and latched into the latches 110. If busy0 is active, the incoming requests are stored into the buffers and latches 110 are not disturbed. The buffer 106 is to store the requests input from the port IN0. The other three buffers are for the other three requests IN1, IN2 and IN3 respectively.

The output of the latches 110 is connected to aligner0 (116) through lines 111–114. If there is a request on line 111, it arrived from IN0 (101). On the way, it passed through the latch 103, decoder 104, line 105, and latches 110. And depending on the status of the busy0 line 118, it might have been stored temporarily in the buffer 106. We can trace the route of the other packets in the same way.

The function of the aligner, such as aligner0 (116), is described in detail in this paragraph. Only the input-output relationships will be described in this section. The internal working of the aligner will be explained later.

Figure 12:
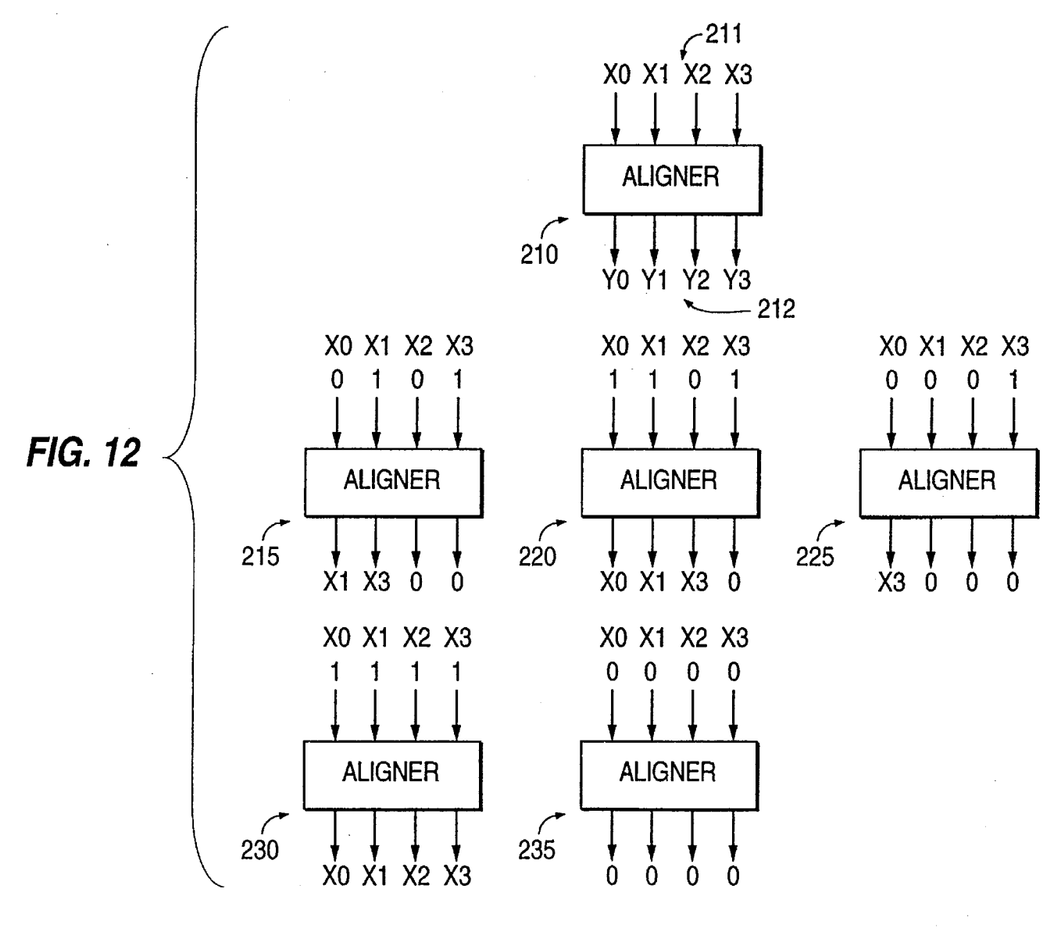
FIG. 12 shows several examples to illustrate the input-output behavior of a 4×4 aligner.

Referring to FIG. 12, an aligner 210 has 4 inputs X0, X1, X2, X3 and 4 outputs Y0, Y1, Y2, Y3. Suppose there are i requests (i=1,2,3,4) present at the inputs 211. The objective of the aligner is to align the i requests so that they appear consecutively at the outputs 212 starting from Y0. Aligners 215–235 illustrate a few examples to clarify the operation of the aligner. Aligner 215 shows a string of 0s and is below the inputs X0–X3. It represents the state of the request_active bit associated with the input below which it is shown. For X0, the request_active bit is 0, i.e., there is no request at X0. For X1, the request_active bit is a 1. So, a request exists at X1. The existence on other inputs can be explained in the same way. Aligner 215 has requests at X1 and X3. The function of the aligner is to group them together and align them from the left side. At the output 215, the pattern is X1, X3, 0, 0. The active requests X1, X3 are aligned from the left. A signal "0" at the output indicates that the corresponding request_active bit is turned off. If the request_active bit is turned off, the other fields are not interpreted by the subsequent stages of the self-routing crossbar switch 100 in FIG. 6. Aligners 220–235 can be explained in the same way. In aligner 230, all the input requests are active and in 235 there is no active request. The above description is sufficient to appreciate the function of the aligner. The internal details are explained later, where not only a 4×4 aligner but also 2×2, 8×8 and N×N aligners have been explained.

PORT CONFLICT RESOLUTION

Returning to FIG. 6, the output of the aligner 116 is input to the resolution logic 117. There are two factors that have to be considered: (i) port conflict resolution and (ii) bank conflict resolution. We first assume that there is no bank conflict and later relax this condition to include the bank conflict.

Figure 7:
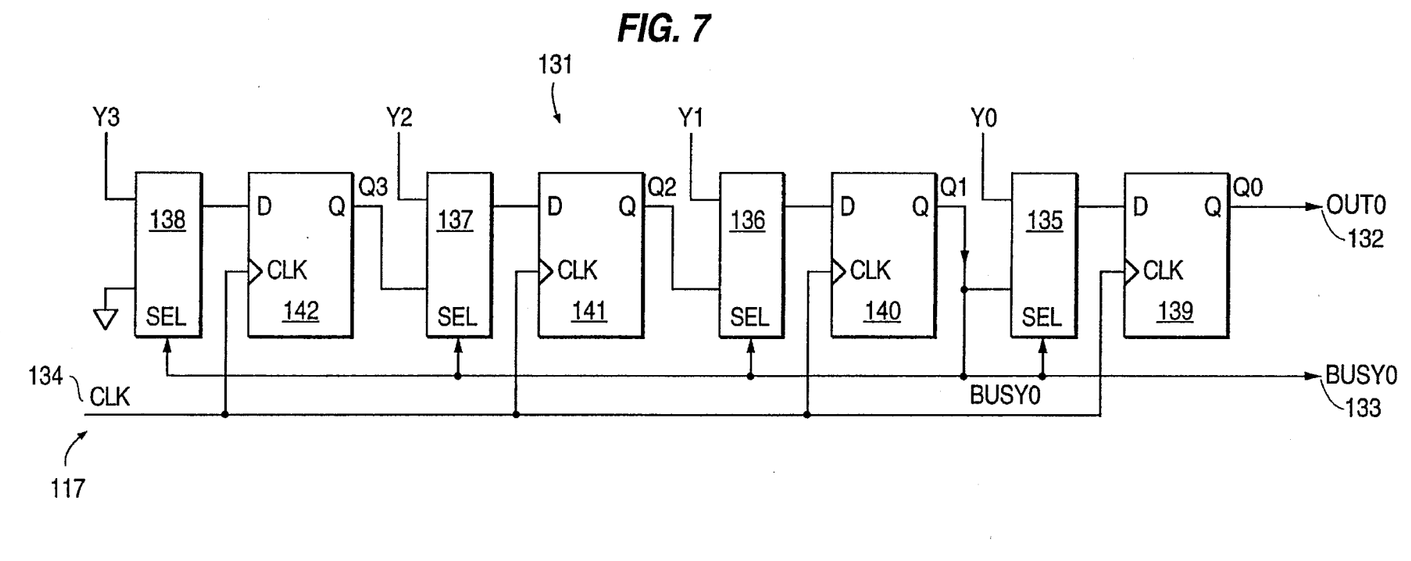
FIG. 7 is a block diagram of the port conflict resolution logic.

Referring to FIG. 7, the port conflict resolution portion of the resolution logic 117 is illustrated. The inputs 131 are Y0, Y1, Y2, Y3 and the outputs are the output port OUT0 (132) and busy0 (133). In addition there is a clock signal CLK (134).

It should be emphasized here that since the input to the port conflict resolution portion is the output of the aligner, the input requests which are active are all aligned; i.e., they are grouped together and appear consecutively, starting from Y0. The valid combinations of the input requests are as follows:

| No. of active requests | Input lines at which they must appear |
|---|---|
| 1 | Y0 |
| 2 | Y0, Y1 |
| 3 | Y0, Y1, Y2 |
| 4 | Y0, Y1, Y2, Y3 |

The port conflict resolution logic comprises selectors 135–138 and flip-flops 139–142. The selectors select either the input 131 or the output of the previous stage of the flip-flops. For the selector 138, there is no previous stage and the lower selector input is connected to logic 0. The output 132 of the first stage of the flip-flops is the desired output OUT0 in FIG. 6. The request_active bit of the request that appears at the output Q1 of 140 of the second stage is same as the busy0 signal of FIG. 6. This is shown as the busy0 signal 133 in FIG. 7. The busy0 signal 133 controls the select input SEL of the selectors 135–138. Initially the busy0 signal 133 is inactive. The upper input of each selector is connected to its respective flip-flops. In other words, the port resolution circuit is monitoring the inputs at 131. Suppose only one input of 131 is active. From the previous discussion, it has to be Y0. When Y0 is latched into the flip-flops 139, it appears at the output 132. Since there is only one request that is to be sent to the output port, the port busy signal 133 is not activated. When more than one request arrives simultaneously, we have to activate the busy0 signal 133 and serialize the requests. We assume that we can service one request per output port in one clock cycle.

In order to explain the working of the circuit when more than one request arrives simultaneously at the port conflict resolution portion, suppose three requests A,B and C arrive at the same time. From the above table, it is evident that they arrive at Y0, Y1 and Y2. Since it will take 3 cycles to serialize and send them to the OUT0 signal 132 one by one, we must activate the busy0 signal 133 for 2 cycles. 2 cycles is the additional time it takes to send B and C to the output port 132.

Figure 8:
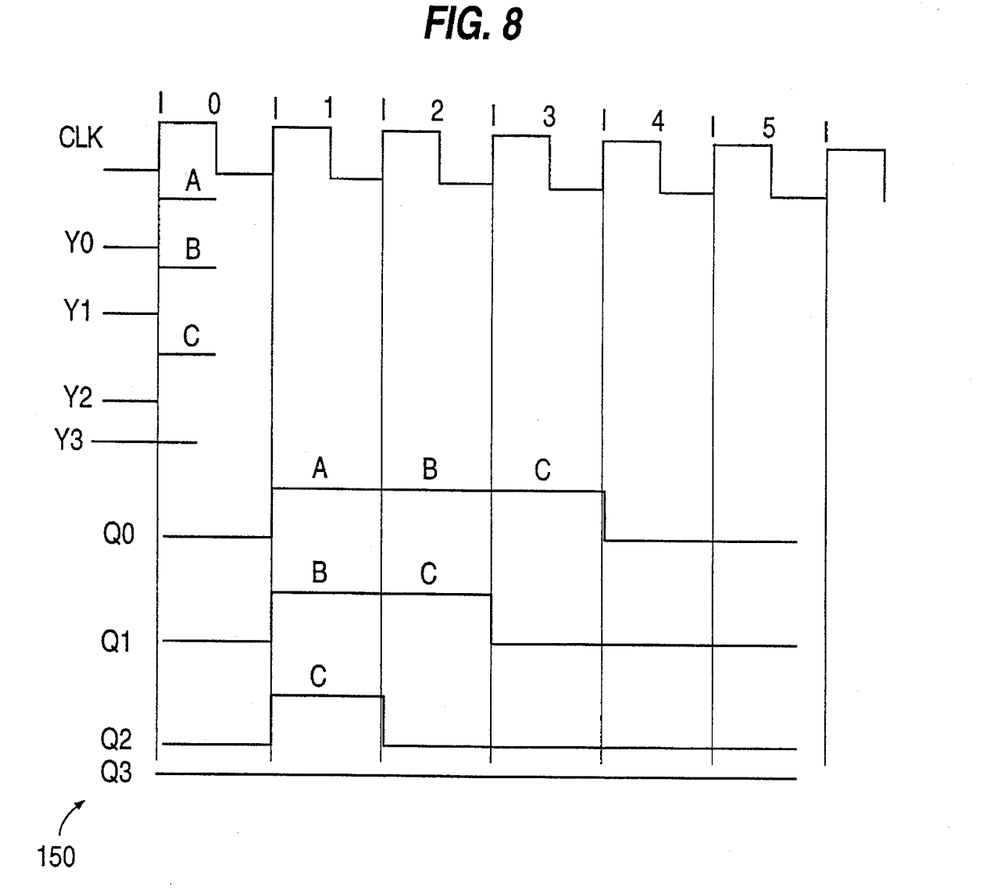
FIG. 8 is a timing chart to explain the operation of FIG. 7.

Referring to FIG. 8 together with FIG. 7, operation of the circuit can easily be understood by examining the timing. At clock=0, the requests A,B,C are sent to the port contention resolution logic 117. They are latched by the flip-flops of 117 at clock=1. Request A appears at OUT0. Since the latched request B at 140 has its request_active bit a logic 1, busy0 becomes a logic 1. This changes the SEL input of the selectors 135–138 so that the D input of a flip-flop gets connected to the Q output of the flip-flop of the previous stage. Consequently, the circuit works as a shift register now. At clock=2, B is output at OUT0 and C is latched into the flip-flop 140. Since C also has its request_active bit a logic 1, the busy0 signal continues to be logic 1. At clock=3, the last of the 3 inputs, C, is output at OUT0. At this stage, the request latched into the flip-flop 140 is not active and busy0 undergoes a transition that changes the SEL input of the selectors so that the circuit 117 is ready to accept new inputs from the next clock.

BANK CONFLICT RESOLUTION

In the previous section we assumed that there was no bank contention and it was assumed that the requests can be sent to an output port of the self-routing crossbar at a rate of 1 request per clock. This assumption is valid if the memory module connected to the output port of the crossbar can always accept a request every clock cycle. In reality, however, the memory module can accept the requests at a rate of 1 request per clock cycle only for certain access patterns. As explained earlier, if the memory module consists of 4 banks and memory cycle time is 4 clock cycles, the memory module can accept the requests every clock if the requests access the 4 memory banks cyclically. If this condition is not satisfied, there will be a bank contention and the rate at which requests are submitted to the memory module has to be slowed down.

Figure 9:
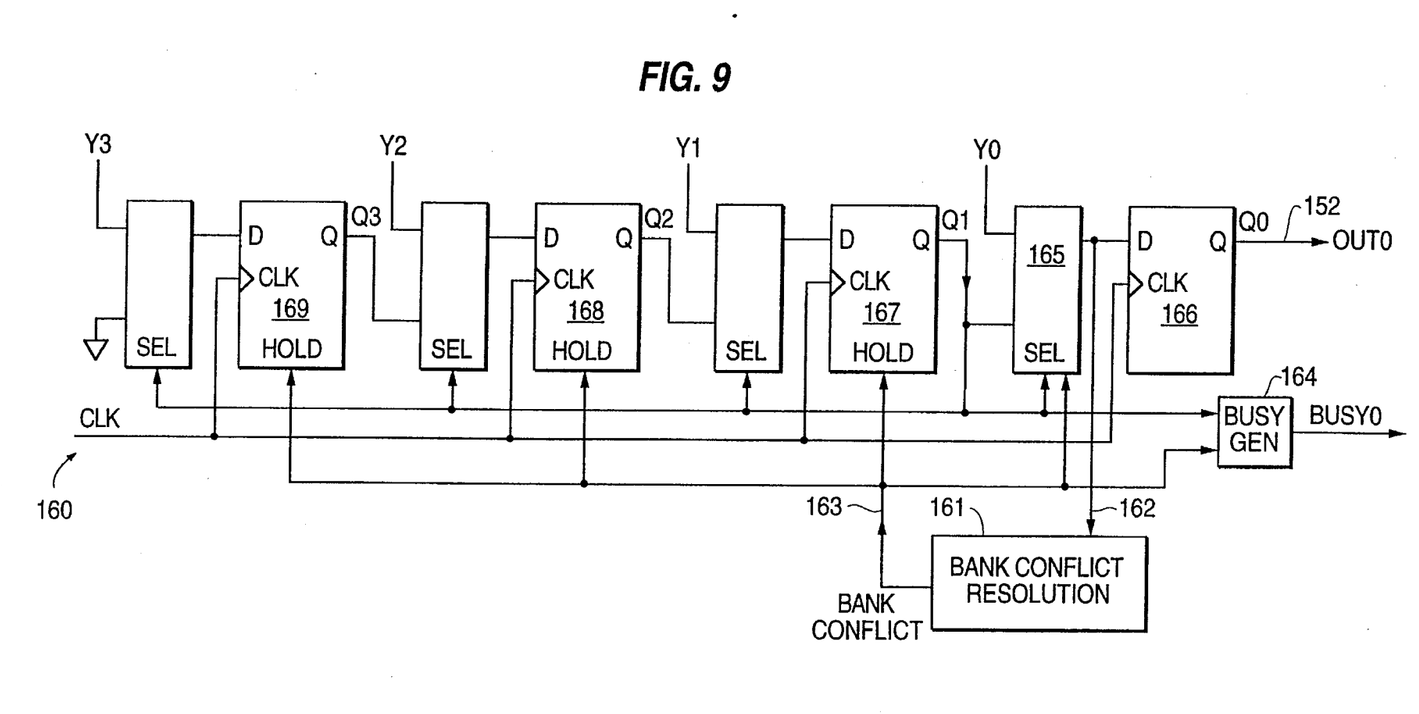
FIG. 9 is a block diagram of the circuit for port contention resolution and bank contention resolution.
Figure 10:
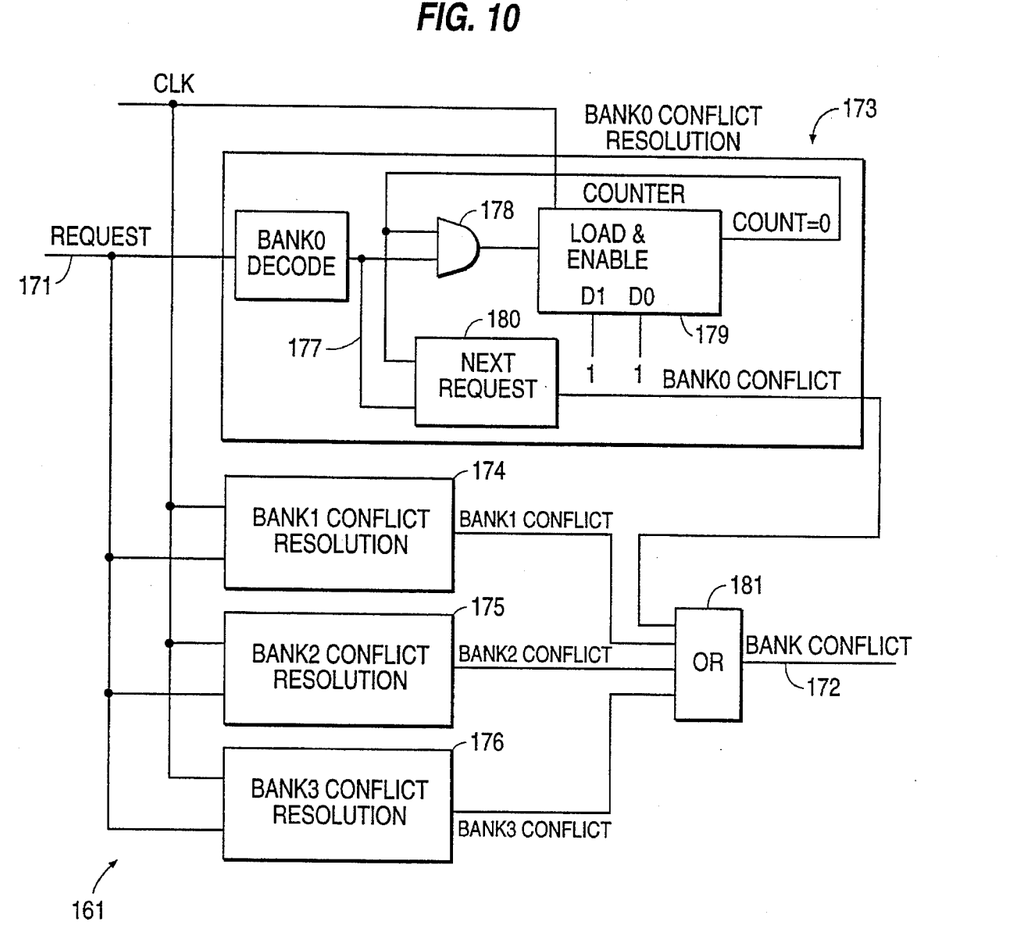
FIG. 10 is a detailed block diagram of bank contention resolution mechanism. The block diagram for bank0 contention resolution is shown in even greater detail.

Referring to FIG. 9 and FIG. 10, the logic that performs the function of resolving the bank contention is shown. FIG. 9 shows the block diagram of the resolution logic 160 that incorporates both port contention resolution logic and bank contention resolution logic. The differences between FIG. 7 and FIG. 9 are:

(i) In FIG. 9, bank conflict resolution has been added at 161.

(ii) In FIG. 9, 164 has been added so that the busy signal is generated not only when there is a port contention, but also when bank conflict is detected.

(iii) In FIG. 9, flip-flops 167–169 have an additional signal, HOLD, which is connected to the bank conflict signal 163 generated by the bank conflict resolution logic 161.

(iv) In FIG. 9, the selector 165 has an additional input, the bank conflict signal 163. The operation of the bank conflict resolution logic can be understood with the help of FIG. 10 where the internal block diagram of the bank conflict resolution logic 161 of FIG. 9 has been drawn. The bank conflict resolution logic 161 has 4 main blocks for bank conflict resolution, one for each bank. The bank conflict signal 172 is activated when any of the local bank conflict signals, bank_conflict0—bank_conflict3, is active. The request 171 is input to each of the 4 circuits 173–176. The format of the request is as shown in FIG. 5. The request_active and bank number signals 171 are examined by the circuits 173–176. The operation of the bank conflict resolution is explained with the help of the bank0 conflict resolution 173. Other circuits 174–176 have identical logic but for the bank number they wish to check. In the bank0 conflict resolution 173, if the request active bit is a logic 1, the bank number is checked to see if the request is for bank0. If the request is directed to bank0, a line 177 is activated which enables the gate 178. A counter 179 is a 2 bit down counter suitable for a bank cycle time of 4 clocks. Initially, the counter 179 is 0 and the COUNT=0 line is a logic 1. Activation of the line 177 loads the counter with binary "11" and enables it. As a result COUNT=0 line goes inactive and the gate 178 is closed till the count becomes 0 again. During the period when the count is non zero, if a request arrives that wishes to access bank0, the gate 180 is enabled that generates the bank0 conflict signal. The activation of bank0 conflict signal activates the gate 181 and the line 172.

The activation of the bank conflict signal generates busy0 signal (164 of FIG. 9). It also freezes the flip-flops 167–169 of 9 by activating the HOLD pin of these flop-flops. This implies that the port conflict resolution logic is delayed by the number of clock cycles it takes to resolve the bank conflict.

As for the flip-flop 166, the request_active bit of the request input to the flip-flop 166 is set to logic 0 by the bank conflict signal so that the memory module does not see an active request for the period for which the bank conflict signal is active.

ALIGNER

The input-output behavior of an aligner with 4 inputs and 4 outputs was explained through examples of FIG. 12. The objective of an aligner is to align the requests input to it so that at the output of the aligner they appear consecutively starting from the left most output. This section explains the method to realize such an aligner.

Figure 11:
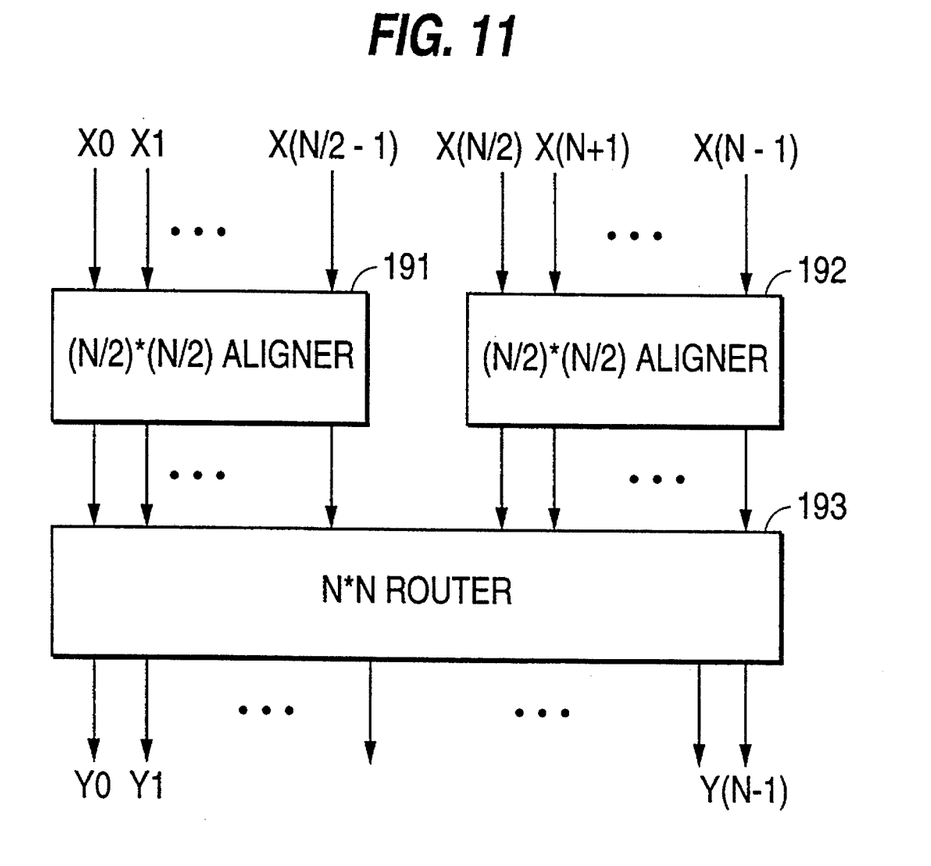
FIG. 11 is a block diagram of an N×N aligner.

The basic idea behind the aligning mechanism is to start with a 2×2 switch. Two 2×2 switches and a router with 4 inputs and 4 outputs form a 4×4 aligner. To realize an 8×8 aligner, two 4×4 aligners are used in conjunction with an 8×8 router. In general, in order to build an N×N aligner, where N=$2^m$, two (N/2)×(N/2) aligners and a router with N inputs and N outputs are required. This is illustrated in FIG. 11.

Figure 13:
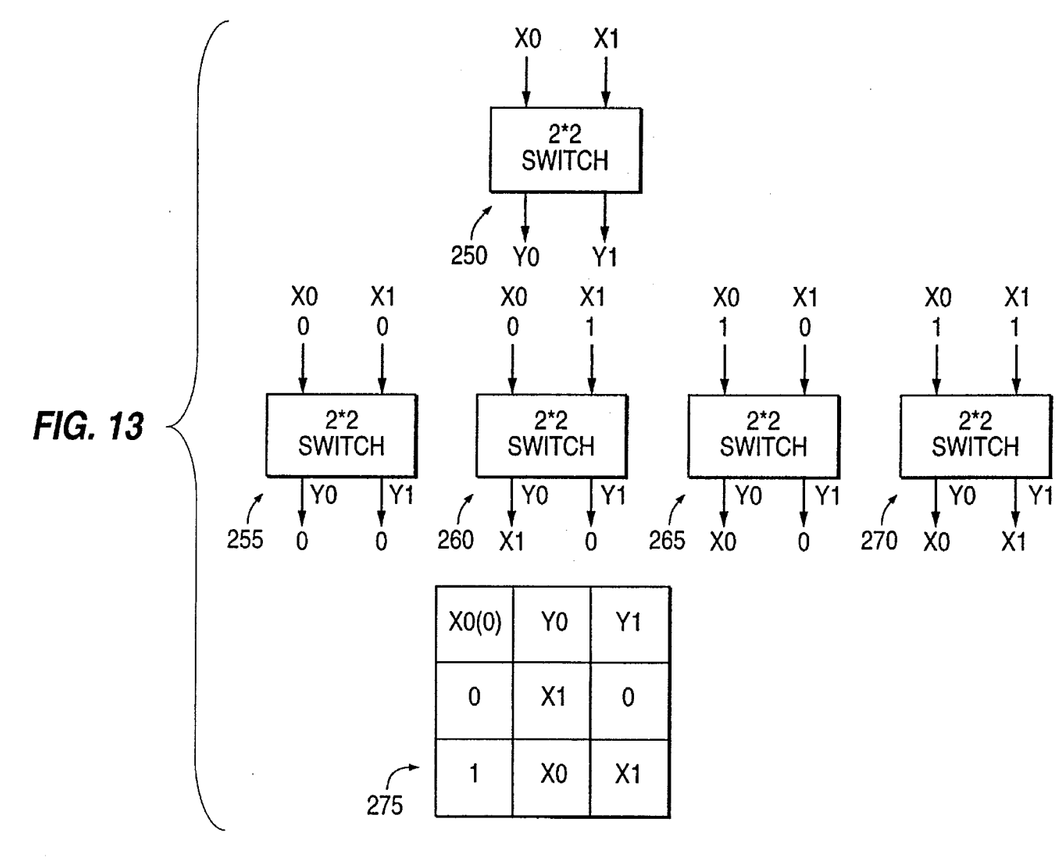
FIG. 13 shows the block diagram, examples and the truth table for a 2×2 aligner.

Referring to FIG. 13, a 2×2 switch is used to build the aligners of higher order. A 2×2 switch 250 has 2 inputs X0, X1 and 2 outputs Y0, Y1. Depending on whether the request—active bit is active or not, there are four combinations of the input requests at X0 and X1. These are shown from 255–270; a 0 or 1 indicates the state of the request_active bit associated with an input request. The 2×2 switch 255 shows the case when there is no input request, the switch 260 has a request at X1, the 2×2 switch 265 has a request at X0 and the 2×2 switch 270 has the requests at both X0 and X1. The corresponding outputs are also shown at Y0 and Y1. It is evident by examining the outputs that if a request is present, it appears at the left hand side of the output. The 2×2 switch 260 particularly stresses this point. The truth table 275 of the logic builds this switch. X0(0) is the request_active bit of the input X0.

Figure 14:
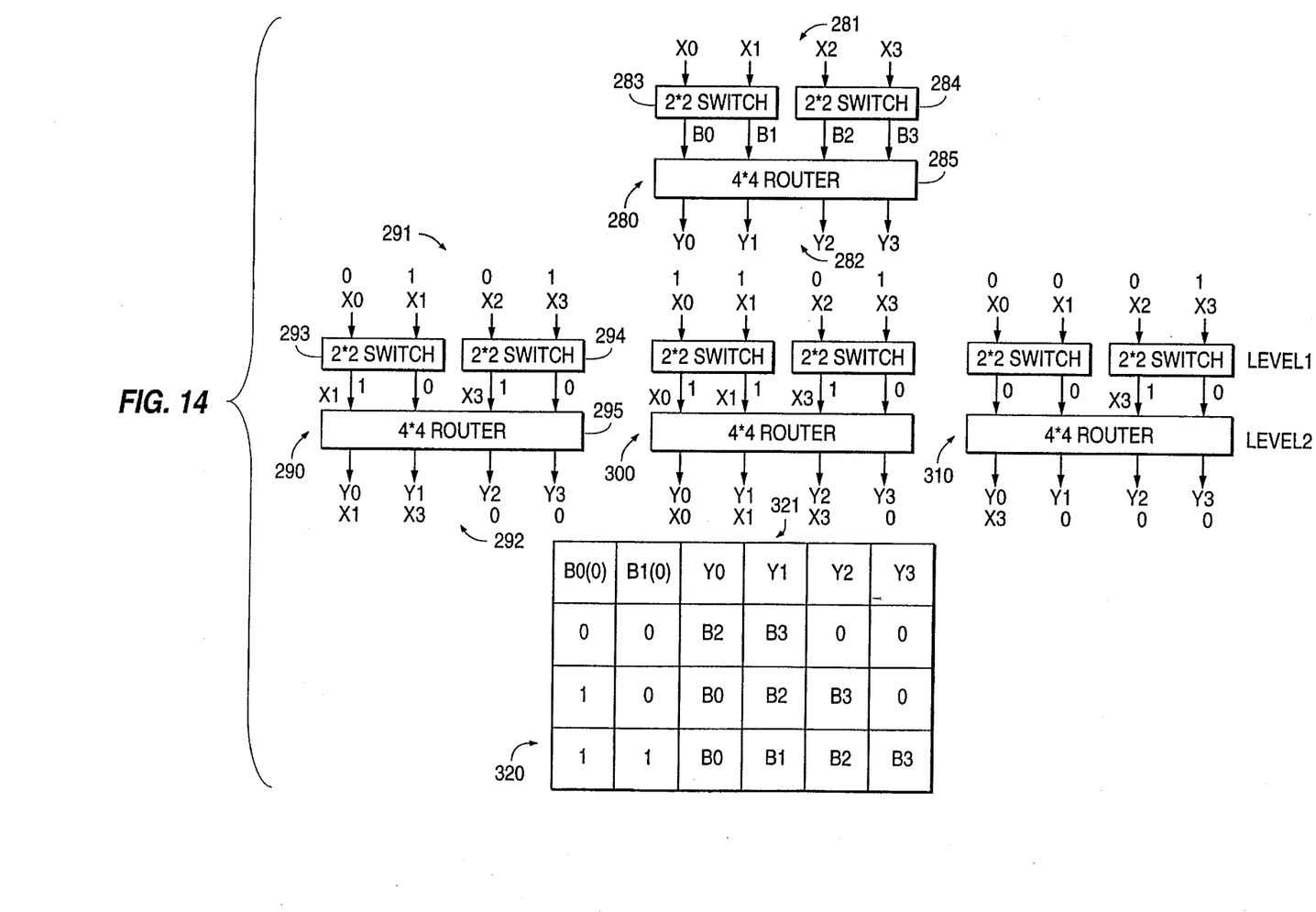
FIG. 14 shows the block diagram, examples and the truth table for a 4×4 aligner.

Referring to FIG. 14, a block diagram of a 4×4 aligner is shown, some examples to show the function of the aligner at 290–310 and the truth table 320 to realize the router. At 280, the inputs are 281 and the outputs are 282. Two 2×2 switches are shown at 283 and 284. A 4×4 router 285 has B0, B1, B2, B3 as inputs and Y0, Y1, Y2, Y3 as outputs. The outputs of the 2×2 switches serve as the input to the router. The output of the router is the output of the aligner.

To explain the 4×4 router 285, the general algorithm for an N×N router is first described; and then with the help of the general algorithm, the specific case of a router with 4 inputs and 4 outputs is explained.

Figure 16:
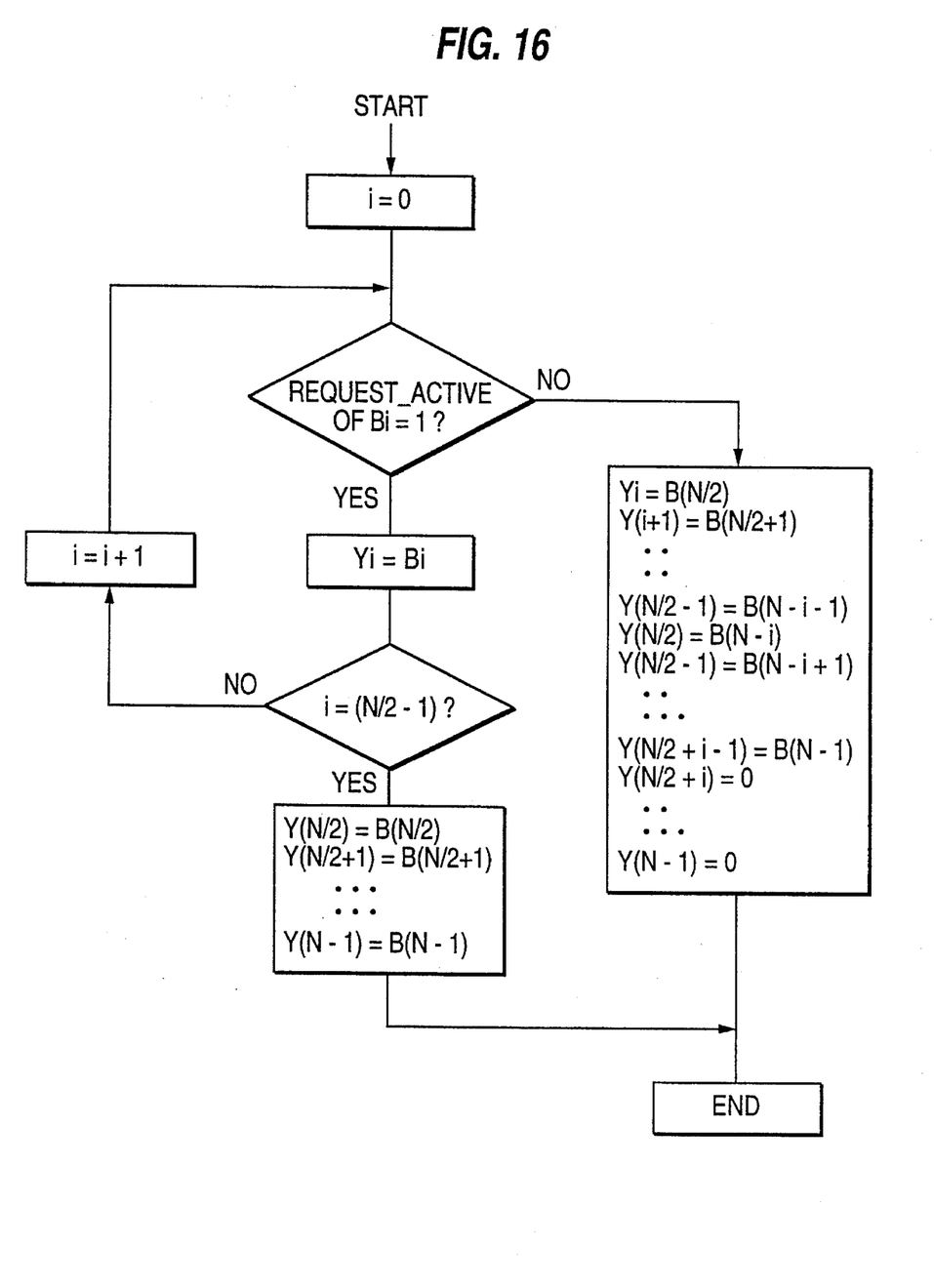
FIG. 16 is a flow chart to explain the operation of an N×N router.

Referring to FIG. 16, the algorithm to build an N×N router is shown.

1. Consider a router with N inputs and N outputs.
2. The N inputs are designated as B0, B1, . . . , B(N-1) and the N outputs are designated as Y0, Y1, . . . , Y(N-1). Divide the inputs into two equal halves: the left hand side consists of B0, B1, . . . , B(N/2-1) and the right hand side consists of B(N/2), B(N/2+1), . . . , B(N-1).
3. Scan the request_active bit of the input request Bi(i= 0,1,2, . . . (N/2-1)), from left to right, starting from B0. Thus, at most N/2 requests will be scanned.
4. Examine the request_active bit of Bi.

Case1:

The request_active bit of Bi is a logic 1.

The ith request Bi is forwarded to the ith output Yi (Yi<—Bi).

If all the N/2 input requests of the left hand side have been scanned, perform the following operation:
Y(N/2)<—B(N/2)
Y(N/2+1)<—B(N/2+1)
. . .
. . .
Y(N-1)<—B(N-1) and the algorithm terminates.
If all the N/2 input requests of the left hand side have not been scanned, Increment i by 1 and repeat step 4.

Case2:

The request_active bit of Bi is a logic 0.

If the request_active bit of Bi is a 0, route the right hand side of the inputs B(N/2), . . . B(N-1) to the left hand side so that they appear from the output Yi to Y(N/2+i-1). The remaining outputs have their request_active bits turned off.

This is equivalent to the following:
Yi=B (N/2)
Y(i+1)=B(N/2+1)
. . .
. . .
Y(N/2-1)=B(N-i-1)
Y(N/2)=B(N-i)
Y(N/2+1)=B (N-i+1)
. . .
. . .
Y(N/2+i-1)=B(N-1)
Y(N/2+i)=0
. . .
. . .
Y(N-1)=0

The algorithm terminates at this stage.

The above algorithm is applied to the 4×4 router 290 in FIG. 14. The inputs X1 and X3 are active. The 2×2 switch 293 accepts X0 and X1 and its outputs are X1 and 0. The 2×2 switch 294 accepts X2 and X3 and its outputs are X3 and 0.

The inputs to 295 are X1, 0, X3, 0. The first and the third inputs have active resists and there are no resists on the second and the fourth output. The inputs are divided into two equal halves: X1,0 forming the left half and X3, 0 forming right half. The left hand side inputs are scanned. The first input is X1 that has its request_input bit on, therefore, Y0<—X1. The next input is scanned. It has its request_active bit turned off. So, the case2 of step 4 of the algorithm is applicable. The right hand side inputs X3 and 0 are shifted so that they appear adjacent to X1. Thus, the order of the outputs is X1, X3, 0. The remaining output Y3 has its request_active bit turned off.

To summarize, the inputs to the aligner were 0, X1, 0, X3, after passing through the 2×2 switches, the order became Xi, 0, X3, 0 and finally after passing through the router, the outputs appeared as X1, X3, 0, 0. Thus, the outputs are aligned from left.

The truth table 320 for the router provides the logic to build the actual hardware. B0(0) and B1(0) are the request active bits of B0 and B1 respectively. Consider the column 321 that provides the necessary information to build the hardware for the Y1 output. In term of a boolean equation, it can be expressed as:

Y1=(not (B0 (0)) and not (B1(0)) and B3) or (B0(0) and not(B1(0)) and B2) or (B0(0) and Bi(0) and B1).

Figure 15:
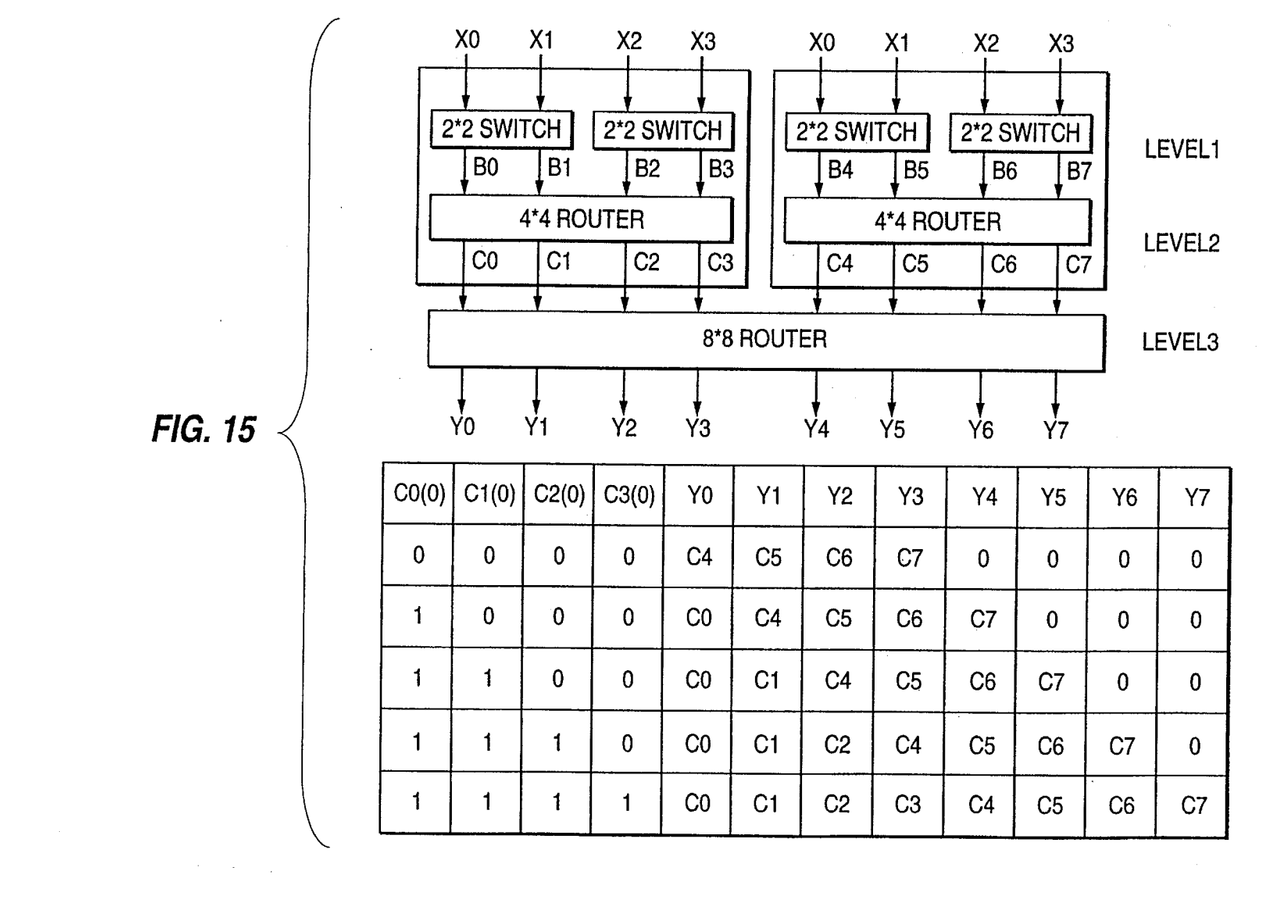
FIG. 15 shows the block diagram and the truth table for a 8×8 aligner.

Referring to FIG. 15, an 8×8 aligner is built from two 4×4 aligners and an 8×8 router. It also shows the truth table necessary to build the hardware. In general, an N×N aligner can be realized using two (N/2)×(N/2) aligners and a N×N router.

Throughout the discussion, alignment was supposed to take from left. However, the entire discussion is also applicable for right alignment. In the case of the right alignment, the order of inputs to the resolution logic is also modified so that the outputs of the aligner are connected to the inputs of the resolution logic in an order that is reverse to the case when the alignment was performed from left; and the operation remains unchanged.

As can be clear from the discussion given hereabove, the crossbar switch according to the present invention is effective in reducing influence of port conflict when port conflict occurs at the output side. Also, according to the present invention, the conflicting requests can be efficiently aligned and supplied to the output port in order so that the influence of port conflict can be reduced. Furthermore, the present invention can efficiently take a measure even for bank conflict occurring at the output side.

What is claimed is:

1. A crossbar switch in a multi-processing system, having N input ports respectively connected to N processors, wherein N is an integer, and N output ports respectively connected to N memory modules, comprising:

decoders respectively coupled to said input ports for distributing memory access requests from said processors to output ports among said N output ports which are designated as destination ports by said memory access requests;

N×N first-in first-out buffers provided at respective outputs of said decoders and separated into N groups, each of said N groups containing N buffers connected to a common destination port;

N N-input and N-output aligners, coupled to outputs of said respective groups of N×N first-in first-out buffers, for aligning effective memory access requests in series; and N serializers connected to outputs of said respective aligners, for serializing the memory access requests aligned by said aligners and outputting to one of said output ports, wherein each of said N-input and N-output aligners includes, two (N/2)-input and (N/2)-output aligners, having two N/2 inputs, each of which correspond to a respective input of said N-input and N-output aligner, for aligning effective memory access requests in series; and an N-input and N-output router, having N inputs, each of which correspond to a respective output of said two (N/2)-input and (N/2)-output aligners, for shifting forward the memory access requests in order so that said memory access requests are packed in series.

2. The crossbar switch as set forth in claim 1, wherein each of said N-input and N-output aligners recursively comprises:

said two (N/2)-input and (N/2)-output aligners, having two N/2 inputs, each of which correspond to a respective input of said N-input and N-output aligner, for aligning effective memory access requests in series; and an N-input and N-inputs router, having N outputs, each of which correspond to an output of said two (N/2)-input and (N/2)-output aligners, for shifting forward the memory access requests in order so that said memory access requests are packed in series, wherein a 2-input and 2-output aligner and a 4-input and 4-output router are provided at a minimum.

3. The crossbar switch as set forth in claim 1, wherein said N-input and N-output router processes memory access requests consecutively from 0 to N/2−1, such that, if an i-th memory access request is effective, the i-th memory access request is output at an i-th output of said N-input and N-output router, but if the i-th memory access request is not effective, the (N/2)th to (N-1)th memory access requests are output respectively at the i-th to (i+N/2−1)th outputs of said N-input and N-output router.

4. The crossbar switch as set forth in claim 1, wherein each of said serializers includes a N-stage shift register taking the outputs of said respective N-input and N-output aligner as inputs for respective stages of said shift register, and the outputs from said shift register are output to said output ports.

5. The crossbar switch as set forth in claim 4, wherein each of said serializers includes a counting means for counting memory cycles for each memory bank which is contained in said memory modules, to maintain said shift register in a hold condition until a predetermined number of memory cycles has been counted by said counting means corresponding to the memory bank to be accessed.

* * * * *